(12) United States Patent
Strong

(10) Patent No.: US 6,240,961 B1
(45) Date of Patent: Jun. 5, 2001

(54) HYDRAULIC POWER STEERING CONTROL VALVE

(75) Inventor: Daniel J. Strong, Clinton Township, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/521,833

(22) Filed: Mar. 9, 2000

(51) Int. Cl.$^7$ ....................................... F15B 9/10
(52) U.S. Cl. ................ 137/625.23; 137/625.24; 91/375 A
(58) Field of Search .............. 137/625.23, 625.24; 91/375 A; 251/250

(56) References Cited

U.S. PATENT DOCUMENTS

| | | | |
|---|---|---|---|
| 5,244,012 | * 9/1993 | Tabata et al. | 137/625.23 |
| 5,263,512 | * 11/1993 | Emori et al. | 137/625.23 |
| 5,458,153 | * 10/1995 | Roeske | 137/625.24 |
| 5,562,124 | * 10/1996 | Behrens et al. | 137/625.23 |
| 5,794,507 | * 8/1998 | Strong | 91/375 A |
| 5,799,693 | * 9/1998 | Strong | 137/625.23 |
| 6,082,403 | * 7/2000 | Strong | 137/625.23 |

* cited by examiner

Primary Examiner—A. Michael Chambers
(74) Attorney, Agent, or Firm—Tarolli, Sundheim, Covell, Tummino & Szabo L.L.P.

(57) ABSTRACT

A hydraulic fluid control valve (18) for a power steering gear (10) includes first and second relatively rotatable valve members (60, 62) which direct hydraulic fluid to flow between the valve members (60, 62) from inlet ports (70) to outlet ports (92). The valve members (60, 62) have radially opposed lands (71–79, 101–109) and grooves (81–89, 121–129) defining orifices (130) that enlarge and orifices (130) that constrict upon relative rotation of the valve members (60, 62) from neutral positions. A pair of the constricting orifices (130b, 130c) are located in parallel between the inlet ports (90) and the outlet ports (92). Each of those parallel constricting orifices (130b, 130c) is defined by a corresponding chamfered corner portion of a corresponding land (101, 102). The valve members (60, 62) provide back pressure at selected orifices between the outlet ports (92) and the inlet ports (90). The selected orifices include both constricting orifices (130b, 130c). The means for providing back pressure comprises a third land (102) which is spaced from the pair of lands. The third land (102) defines a third orifice (130d) located in series with the parallel constricting orifices. The third orifice (130d) has a constant size for all relative positions of the first and second valve members (60, 62) through the range of movement of the valve.

4 Claims, 5 Drawing Sheets

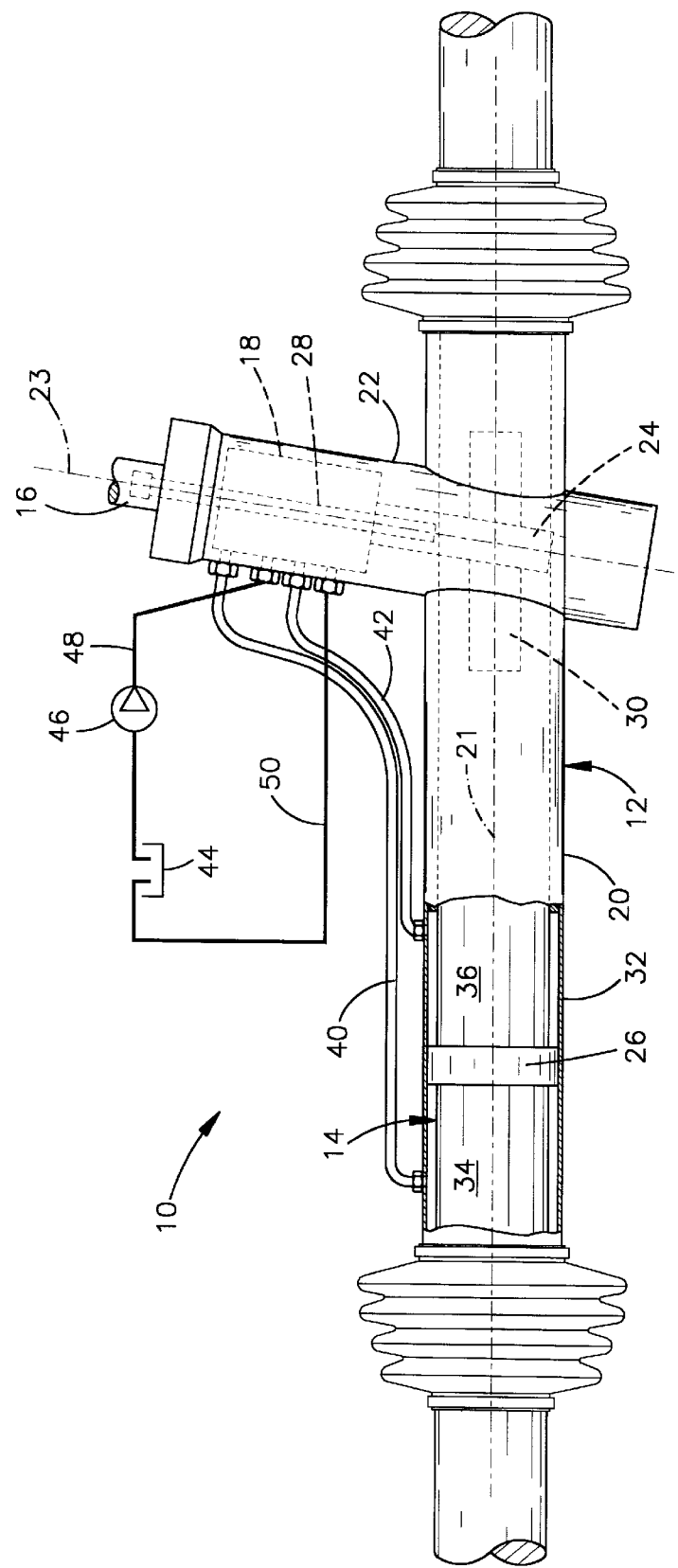

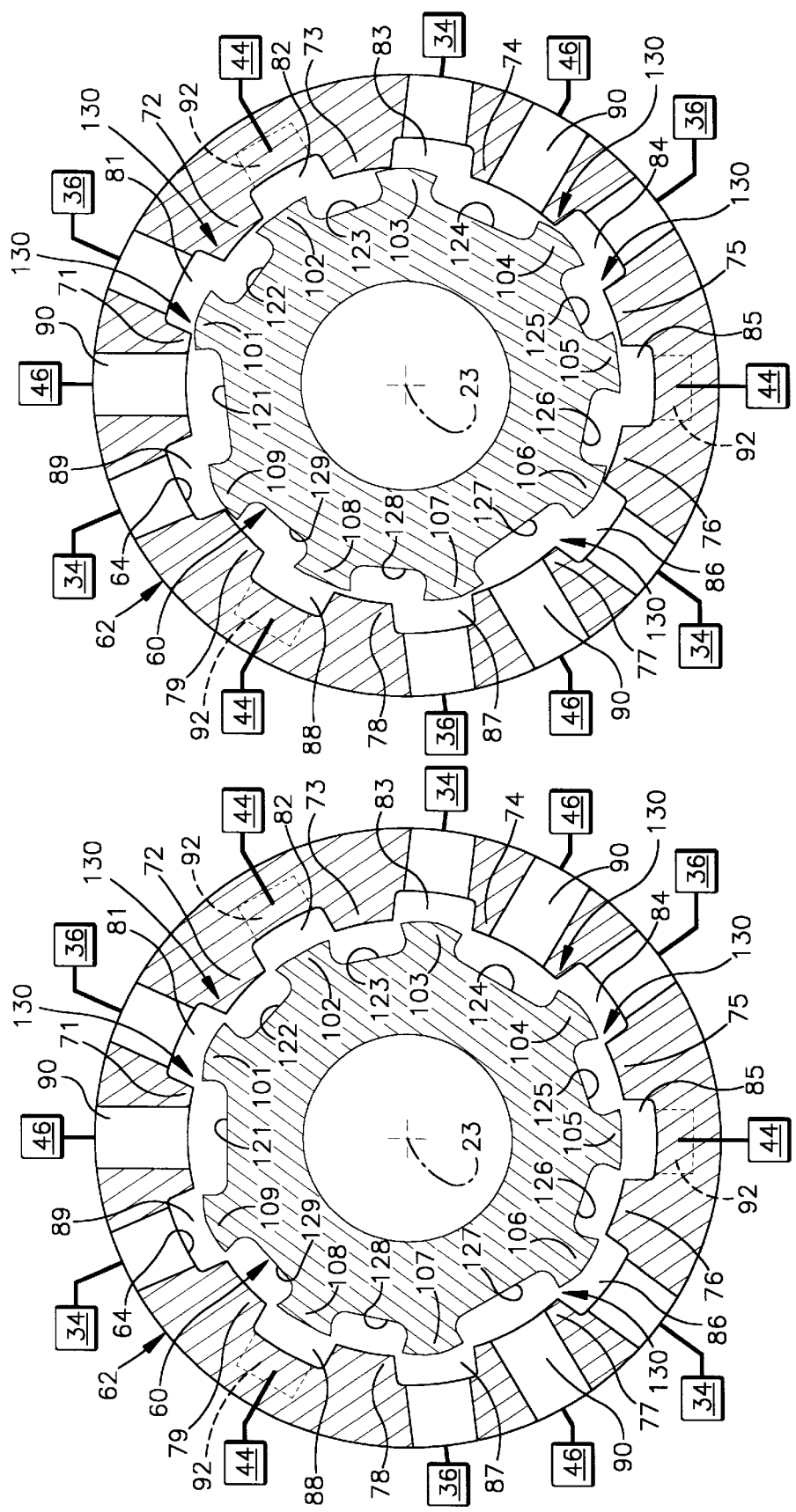

HYDRAULIC POWER STEERING CONTROL VALVE

BACKGROUND OF THE INVENTION

1. Technical Field

The present invention relates to a hydraulic fluid control valve for a power steering gear. In particular, the present invention relates to a control valve that can help to reduce brake shudder, that is, a vibration from a vehicle's brakes into the vehicle steering system.

2. Description of the Prior Art

A known hydraulic fluid control valve for a power steering gear includes a valve core rotatable within a valve sleeve. The core and the sleeve control the pressure of hydraulic fluid flowing through the valve between a pump, a reservoir, and a pair of opposed fluid chambers on opposite sides of a piston in a hydraulic motor. When the core and the sleeve are in neutral positions, the hydraulic fluid pressures in the opposed fluid chambers are equal. When the core and the sleeve are rotated from the neutral positions, a plurality of lands and grooves on the core and the sleeve cooperate to increase the hydraulic fluid pressure in one of the opposed fluid chambers so as to provide hydraulic power steering assist in the steering gear.

SUMMARY OF THE INVENTION

In accordance with the present invention, an apparatus comprises first and second relatively rotatable valve members which direct hydraulic fluid to flow between the valve members from inlet ports to return ports. The valve members have radially opposed lands and grooves defining orifices that enlarge and orifices that constrict upon relative rotation of the valve members from neutral positions through a range of movement of the valve.

A pair of the constricting orifices are located in parallel between the inlet ports and the return ports. Each of those parallel constricting orifices is defined by a chamfered corner of a corresponding one of the lands. Additionally, the valve members comprise means for providing back pressure at selected orifices between the outlet ports and the inlet ports, the selected orifices including only one of the pair of parallel constricting orifices.

The back pressure is provided by a third land which is spaced from the pair of lands and which defines a third orifice located in series with the one of the pair of parallel constricting orifices. The third orifice has a constant size for all relative positions of the first and second valve members through the range of movement of the valve.

This increase in back pressure helps to limit unwanted piston movement and thereby reduce brake shudder, that is, undesired vibration of the steering wheel when on center.

BRIEF DESCRIPTION OF THE DRAWINGS

Further features of the present invention will become apparent to those skilled in the art to which the present invention relates from reading the following description with reference to the accompanying drawings, in which:

FIG. 1 is a view of a fluid power assisted rack and pinion steering apparatus comprising a first embodiment of the present invention;

FIG. 2 is a view of parts of the apparatus of FIG. 1, with certain parts being shown in section and with other parts being shown schematically;

FIG. 3 is a view similar to FIG. 2 showing parts in different positions;

DESCRIPTION OF PREFERRED EMBODIMENTS

Figure 4:
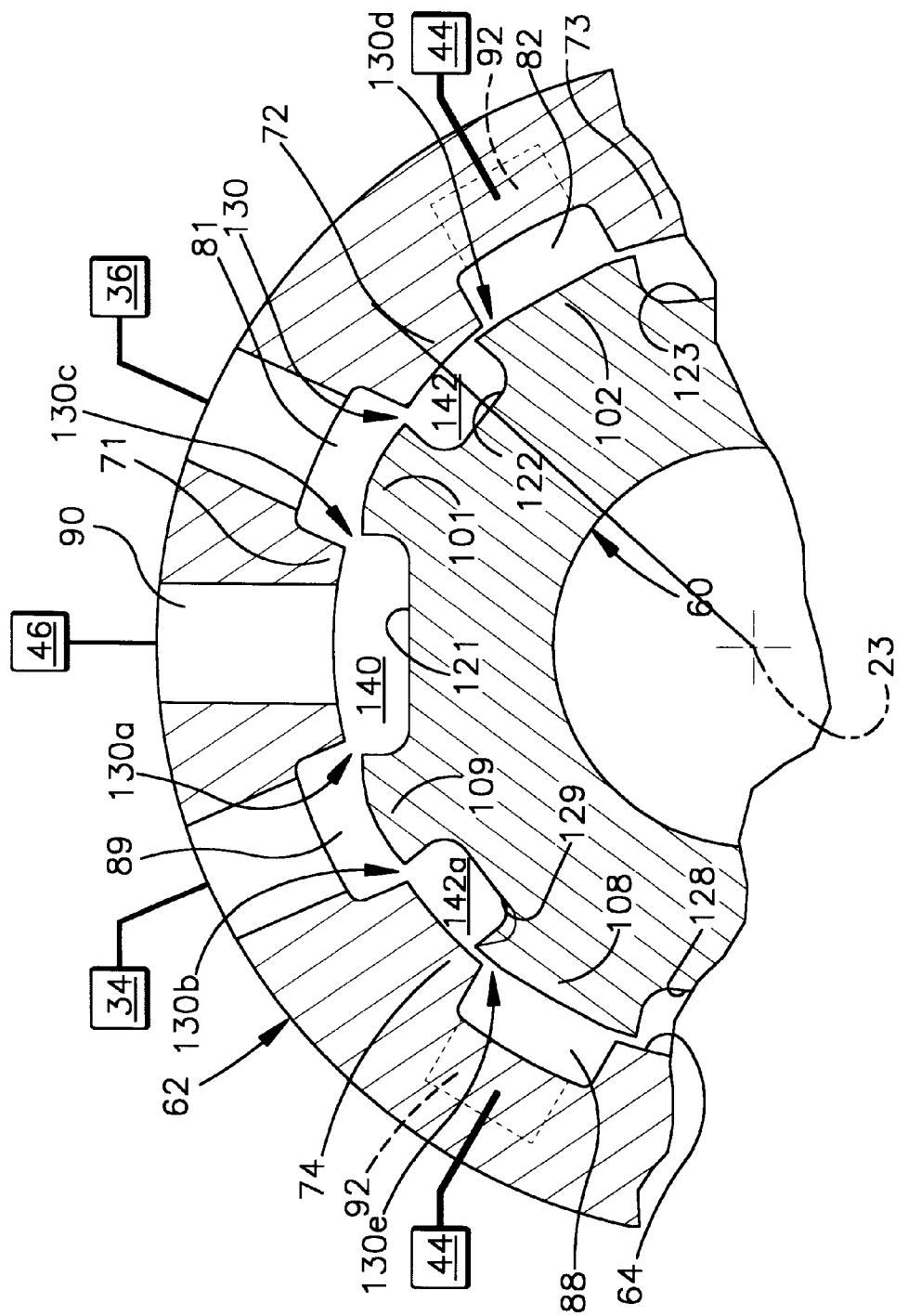
FIG. 4 is an enlarged partial view of parts shown in FIG. 2.

A hydraulic power steering gear 10 comprising a first embodiment of the present invention is shown in FIG. 1. The steering gear 10 is a hydraulically-assisted rack and pinion steering gear including a housing 12, a steering rack 14 and an input shaft 16. As shown schematically in FIG. 1, the steering gear 10 further includes a hydraulic fluid control valve 18 which is contained in the housing 12.

The rack 14 extends longitudinally through a lower portion 20 of the housing 12 along a horizontal axis 21, and is supported for movement relative to the housing 12 along the axis 21. When the steering gear 10 is installed in a vehicle, the opposite ends (not shown) of the rack 14 are connected to steering linkages which, in turn, connect the steering gear 10 to a pair of steerable vehicle wheels.

The input shaft 16 projects outward from an upper portion 22 of the housing 12 along another axis 23, and is rotatable about the axis 23 in response to rotation of the vehicle steering wheel. The steering gear 10 operates to move the rack 14 along the axis 21 in response to rotation of the input shaft about the axis 23. The steering gear 10 thus actuates the steering linkages to steer the vehicle wheels in response to rotation of the steering wheel.

Other parts of the steering gear 10 include a pinion gear 24 and a piston 26. The pinion gear 24 is connected with the input shaft 16 by a torsion bar 28, and is supported for rotation about the axis 23 in meshing engagement with a row of rack teeth 30 on the rack 14. A tubular section 32 of the lower housing portion 20 functions as a power cylinder. The piston 26 is fixed to the rack 14 within the power cylinder 32. A pair of variable volume hydraulic fluid chambers 34 and 36 are located in the power cylinder 32 on opposite sides of the piston 26.

The valve 18 communicates with the first chamber 34 in the power cylinder 32 through a first two-way conduit 40. The valve 18 communicates with the second chamber 36 in the power cylinder 32 through a second two-way conduit 42. As further shown schematically in FIG. 1, the valve 18 receives hydraulic fluid from a reservoir 44 and a pump 46 through an inlet conduit 48. The pump 46 could be a flow-varying pump, and could be driven by an electric motor or by the vehicle engine. An outlet conduit 50 exhausts hydraulic fluid from the valve 18 to the reservoir 44.

The valve 18 operates in response to rotation of the input shaft 16 with the vehicle steering wheel. When the input shaft 16 rotates with the steering wheel in a first direction about the axis 23, it rotates slightly relative to the pinion gear 24. The torsion bar 28 flexes to permit such rotation of the input shaft 16 relative to the pinion gear 24. The valve 18 responds to the resulting rotational displacement by opening hydraulic fluid flow paths that extend through the valve 18 from the inlet conduit 48 to the first two-way flow conduit 40. The valve 18 simultaneously closes hydraulic fluid flow paths that extend through the valve 18 from the second two-way flow conduit 42 to the outlet conduit 50. A resulting flow of hydraulic fluid from the pump 46, and a resulting hydraulic fluid pressure differential acting across the piston 26, cause the piston 26 and the rack 14 to move to the right, as viewed in FIG. 1, along the axis 21. This causes the steering linkage to steer the vehicle wheels in a first direction.

As the rack moves along the axis 21 with the piston 26, the pinion gear 24 rotates in meshing engagement with the rack teeth 30. The pinion gear 24 then rotates about the axis 23 relative to the input shaft 16 in a follow-up manner so as to cancel the rotational displacement between the pinion gear 24 and the input shaft 16. The valve 18 responds by closing the previously opened hydraulic fluid flow paths. This equalizes the hydraulic fluid pressures acting on the piston 26 in the two chambers 34 and 36 in the power cylinder 32, and causes the piston 26 and the rack 14 to stop moving along the axis 21.

When the vehicle wheels are to be steered in an opposite direction, the input shaft 16 is rotated with the steering wheel in an opposite direction about the axis 23, and is again rotated slightly relative to the pinion gear 24 upon flexing of the torsion bar 28. The valve 18 responds by pressurizing the second chamber 36 and by simultaneously exhausting the first chamber 34. The piston 26 and the rack 14 then move axially to the left, as viewed in FIG. 1. A resulting follow-up rotation of the pinion gear 24 relative to the input shaft 16 causes the valve 18 again to equalize the hydraulic fluid pressures in the two chambers 34 and 36 in the power cylinder 32.

As shown in FIG. 2, the valve 18 includes a valve core 60 and a valve sleeve 62. Both the core 60 and the sleeve 62 have generally cylindrical shapes centered on the axis 23. The core 60 is defined by a section of the input shaft 16 (FIG. 1). The sleeve 62 is connected with an upper end portion of the pinion gear 24 (FIG. 1). Accordingly, the core 60 and the sleeve 62 rotate relative to each other when the input shaft 16 and the pinion gear 24 rotate relative to each other. As described in detail below, the core 60 and the sleeve 62 then vary the hydraulic fluid flow paths extending through the valve 18 so that certain flow paths become relatively unrestricted and certain flow paths become relatively restricted. Pressurized flows of hydraulic fluid are thereby directed through the valve 18 between the pump 46 and the fluid chambers 34 and 36 in the power cylinder 32, as described above with reference to FIG. 1.

The sleeve 62 has a radially inner periphery 64 extending circumferentially around the core 60. The inner periphery 64 of the sleeve 62 has an undulating contour defined by a plurality of circumferentially spaced lands and grooves. Specifically, the sleeve 62 has nine lands 71, 72, 73, 74, 75, 76, 77, 78 and 79 which are spaced apart circumferentially about the axis 23. The sleeve 62 further has nine grooves 81, 82, 83, 84, 85, 86, 87, 88 and 89, each of which is located circumferentially between a pair of adjacent lands.

Three inlet ports 90 extend radially inward through the sleeve 62 at the locations of the first land 71, the fourth land 74, and the seventh land 77. As shown schematically in FIG. 2, the inlet ports 90 receive hydraulic fluid from the pump 46.

As further shown schematically in FIG. 2, some of the grooves in the sleeve 62 communicate with the fluid chambers 34 and 36 in the power cylinder 32 (FIG. 1), and some of the grooves communicate with the reservoir 44. Specifically, the first, fourth and seventh grooves 81, 84 and 87 communicate with the chamber 36 on the right side of the piston 26. The third, sixth and ninth grooves 83, 86 and 89 communicate with the other chamber 34 on the left side of the piston 26. The second, fifth and eight grooves 82, 85 and 88 communicate with the reservoir 44 through outlet ports 92 (shown schematically) at the ends of the grooves 82, 85 and 88.

The core 60 also has an undulating contour defined by circumferentially spaced lands and grooves. These include nine lands 101–109 and nine grooves 121–129. The lands 101–109 on the core 60 are located radially opposite the grooves 81–89 in the sleeve 62. The grooves 121–129 in the core 60 are located radially opposite the lands 71–79 on the sleeve 62. Accordingly, the adjacent corners of the lands 71–79 and 101–109 define eighteen orifices 130 between the grooves 81–89 and 121–129.

When a steering maneuver is not being performed, the core 60 and the sleeve 62 are located in neutral positions, as shown in FIG. 2. Hydraulic fluid then flows from the inlet ports 90 to the outlet ports 92 through the grooves 121–129, the orifices 130, and the grooves 81–89. This flow results from a pressure drop between the pump 46 and the reservoir 44. However, there is no pressure differential between the fluid chambers 34 and 36 in the power cylinder 32 when a steering maneuver is not being performed. Accordingly, there is no pressure differential between the set of grooves 81, 84 and 87 that communicate with the right chamber 36 and the other set of grooves 83, 86 and 89 that communicate with the left chamber 34.

When the vehicle steering wheel and the input shaft 16 (FIG. 1) are turned to the left, the core 60 rotates relative to the sleeve 62 in a counterclockwise direction, as viewed in FIGS. 2 and 3. Six of the eighteen orifices 130 are then enlarged, and six orifices 130 are then constricted. This causes the hydraulic fluid pressure to increase in the set of grooves 83, 86 and 89 that communicate with the left chamber 34 in the power cylinder 32. In this manner, a small portion of the hydraulic fluid flow extending from the inlet ports 90 to the outlet ports 92 is diverted to the left chamber 34 through the grooves 83, 86 and 89. An equal flow of hydraulic fluid is simultaneously exhausted from the right chamber 36 to the corresponding grooves 81, 84 and 87. The piston 26 and the rack 14 then move to the right, as viewed in FIG. 1. This causes the steering linkages to turn the steerable vehicle wheels to the left.

As shown in the enlarged view of FIG. 4, one of the orifices 130 that enlarges is differentiated from three of the orifices 130 that constrict upon rotation of the core 60 from the neutral position of FIG. 2 to the shifted position of FIG. 3. Specifically, one of the enlarging orifices 130 is designated by the reference number 130a in FIG. 4. An adjacent pair of constricting orifices 130 are designated by the reference numbers 130b and 130c. Those constricting orifices 130b and 130c define circumferentially opposite ends of a high pressure region 140 located within the valve 18 between the pump 46 and the left fluid chamber 34. Another orifice 130 is designated by the reference number 130d. The orifices 130d and 130c define circumferentially opposite ends of a low-pressure region 142 which is located within the valve 18 between the right fluid chamber 36 and the reservoir 44. (Because of the small scale of FIGS. 2 and 3, these orifices are not shown in those views to be differentiated.)

As described above, hydraulic fluid continuously flows between the core 60 and the sleeve 62 from the inlet ports 90 to the outlet ports 92. Accordingly, the orifice 130d of FIG. 4 is located downstream of the constricting orifice 130c. The orifice 130d thus provides back pressure at the constricting orifice 130c. A stabilizing back pressure force is applied to the piston 26 in the low pressure fluid chamber 36 by applying back pressure to the flow at the orifices 130c and 130a. This results from the chamfered shapes of the corner portions of the lands 109, 101, and 102 beside the orifices 130b, 130c and 130d, respectively.

Figure 5:
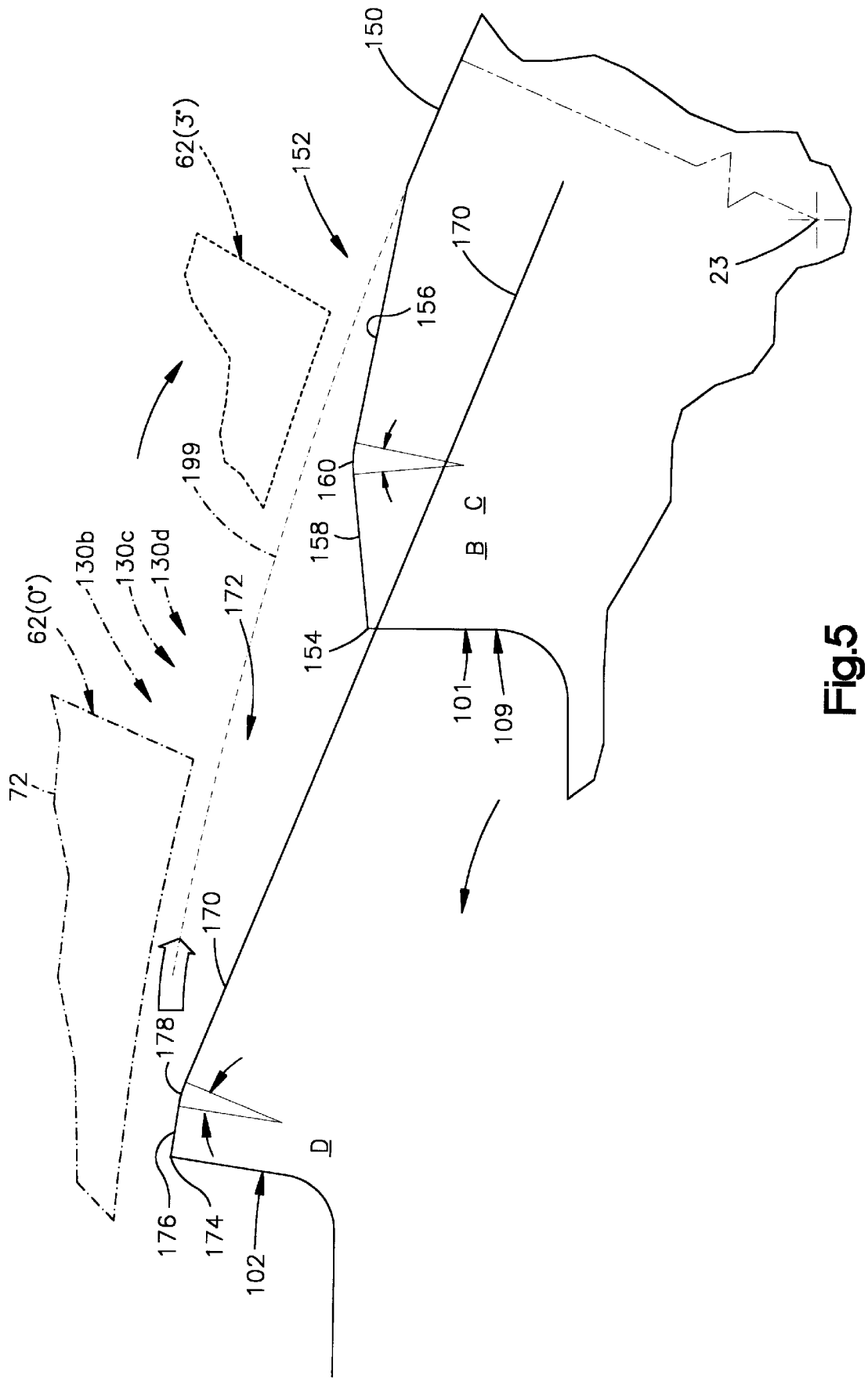
FIG. 5 is an enlarged view showing a superimposed relationship of parts shown in FIG. 4.

FIG. 5 shows the chamfered corner portions of the lands 109, 101 and 102 at the orifices 130b, 130c, and 130d, respectively, in a superimposed relationship of radial profiles for the purpose of comparison with each other.

The land 109 that defines the orifice 130b, and the land 101 that defines the orifice 130c, have the same configuration. Each one of the lands 109 and 101 has a cylindrical surface 150 with a circular radial profile centered on the axis 23 of rotation. Each one of the lands 109 and 101 further has an edge surface 152 which is inclined radially inward from the cylindrical surface 150 to the adjacent corner 154 of the land. The edge surface 152 comprises a plurality of smaller surfaces having distinct radial profiles. These include a first planar facet 156, a second planar facet 158, and an arcuate first intermediate surface 160. The first facet 156 extends from the cylindrical surface 150 to the first intermediate surface 160. The first intermediate surface 160 is tangent to each of the first and second facets 156 and 158. The second facet 158 is inclined radially inward relative to the first facet 156. The second facet extends from the first intermediate surface 160 to the corner 154.

The land 102 that defines the orifice 130d is substantially different from the lands 101 and 109. The land 102 has a major surface 170 that is planar or that has a circular radial profile centered on the axis 23 of rotation. The land 102 further has a very small edge surface 172 which is inclined radially inward from the surface 150 to the adjacent corner 174 of the land 102. The edge surface 172 comprises two smaller surfaces having distinct radial profiles. These include a planar facet 176 and an arcuate intermediate surface 178. The facet 176 extends from the intermediate surface 178 to the corner 174. The intermediate surface 178 is tangent to both the major surface 170 and the facet 176.

It should be understood that the edge surface 172 may, alternatively, include either two or three facets joined by an appropriate number of intermediate surfaces. In addition, the land 102 may have a "crowned" configuration as shown in my co-pending U.S. patent application Ser. No. 09/057,816, filed Apr. 9, 1998, entitled "POWER STEERING CONTROL VALVE WITH BACK PRESSURE.", Now U.S. Pat. No. 6,082,403, issued Jul. 4, 2000.

The orifice 130d (FIG. 4) is defined between the land 102 and the land 72. The configuration and placement of the land 102 ensures that the size of the orifice 130d is constant, and has a relatively small value.

First, the edge surface 152 is radially inward of the adjoining corner of the sleeve 62 even when the valve 18 is at the centered position. Counterclockwise rotation of the core 60 relative to the sleeve 62, as viewed in FIGS. 4 and 5, from the centered position, keeps the land 102 radially inward of the land 72 of the sleeve 62. Thus, the orifice 130d remains at a constant value at all rotational positions of the valve 18.

Specifically, the radial distance between the land 102 on the core 60 and the adjoining surface on the sleeve 62 is always the same, no matter what degree of relative rotation of the valve parts. Because the corner 174 on the core 60 is already located radially inward of the adjoining land on the sleeve 62 when the valve 18 is at the neutral or centered position, the size of the orifice 130d is, at all angles, defined by the radial distance between the land 102 and the sleeve 62. This distance, as noted above, is constant through the range of rotation of the valve 18. Therefore, when the valve 18 is rotated off center, the size of the orifice 130d does not change.

Second, the orifice 130d has a relatively small value at all valve angles, and is substantially smaller than the orifices 130b and 130c when the valve 18 is at the zero position, as can be seen from FIG. 5.

Specifically, the orifice 130d, in one valve constructed in accordance with the invention, has a size of from about 0.030 mm to about 0.090 mm when the valve 18 is centered, that is, at zero degrees. In this one valve 18, the orifices 130c and 130d, when the valve is in this centered condition, have a size of from about 0.100 mm to about 0.300 mm.

It is preferred that the size of the orifice 130d be in the range of from about 15% to about 50% of the size of each of the orifices 130b and 130c when the valve 18 is in the neutral or centered position.

In the valve 18, the orifice 130d (FIG. 4) is located between the second motor chamber 36 and the return passage 92. Because the orifice 130d is relatively small to begin with and stays that same size, it provides a constant restriction to flow from the second motor chamber 36 to the return 92. This tends to restrict flow of fluid out of the second motor chamber 36. This tends to stabilize the piston 26 in the motor by resisting movement of the piston in the cylinder 32 in a direction which would exhaust fluid from the motor chamber 36. Note that when the valve 18 is centered, both sides of the piston 26 are "low pressure" and this design provides increased back pressure on both sides of the piston.

Specifically, when the valve 18 is at the neutral position, the orifice 130d is very small. This tends to block flow of fluid out of the motor chamber 36 through the groove 81, the orifice 130, the groove 142, and the orifice 130d, to return. At the same time, the orifice 130e on the opposite side of the valve 18, which is a mirror image of the orifice 130d, is also very small. This tends to block flow of fluid out of the first motor chamber 34 through the groove 89, the orifice 130b, the groove 142a, and the orifice 130e, to return.

This resistance to movement of the piston 26 reduces vibration in the vehicle steering wheel when braking at a time when the valve 18 is centered or nearly centered. Prior art valves do not have this effect because they do not have a constantly small orifice corresponding to the orifice 130d.

When the valve core 60 rotates relative to the valve sleeve 62, to the left as viewed in FIG. 5, the orifices 130b and 130c become constricted in the manner described above with reference to FIGS. 3 and 4. Specifically, the orifices 130b and 130c initially constrict as the lands 109 and 101 move toward the opposed corners on the sleeve 62 in directions of movement extending from right to left in FIG. 5. Also shown in FIG. 5 is a circular line 199 which is concentric with the cylindrical surface. Since the corners 154 on the lands 101 and 109 are all spaced radially inward from the circular line 199, none of the orifices 130b or 130c becomes fully constricted when the corresponding corner 154 moves beside the opposed corner on the sleeve 62. Instead, each of those orifices 130b and 130c continues to constrict as the corresponding edge surface moves past the opposed corner on the sleeve 62.

The orifice 130d, because it is substantially closed as noted above, applies back pressure to the flow of hydraulic fluid then passing through the orifice 130c, as described above with reference to FIG. 4.

Figure 6:
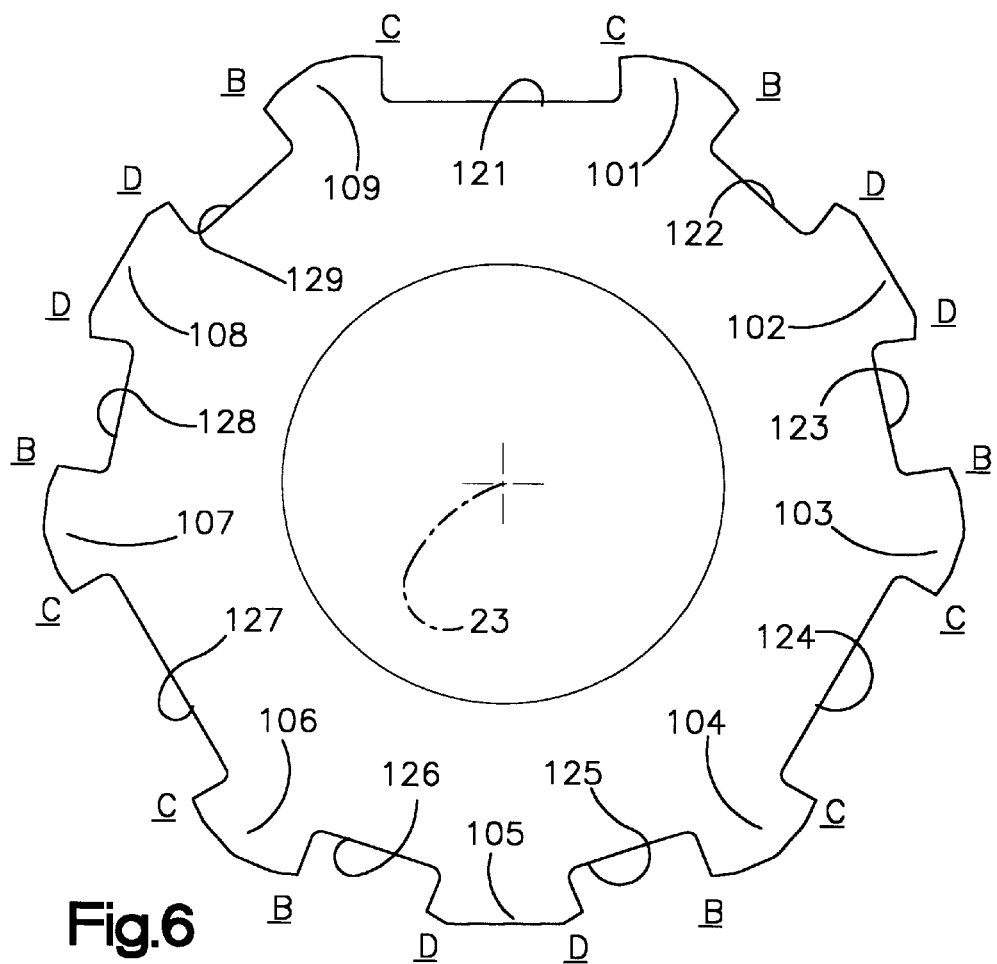
FIG. 6 is a view of a part shown fully in FIGS. 2 and 3.

As further shown in FIG. 5, the chamfered corner contour of the land 109 beside the orifice 130b is designated by the letter B. The chamfered corner contour of the land 101 beside the orifice 130c is designated by the letter C. The chamfered contour of the land 102 beside the orifice 130d is similarly designated by the letter D. FIG. 6 shows the preferred locations where the B, C, and D contours are repeated about the circumference of the core 60. Although the B and C contours are preferably the same as each other, as shown in FIG. 5, they could alternatively be different from each other.

In the arrangement of FIG. 6, any pair of constricting orifices at opposite ends of a high-pressure region between the core 60 and the sleeve 62 will have back pressure applied. The back pressure will be applied by the next constricting orifice located downstream from the orifice receiving back pressure. In other words, whenever a pair of corners having the B and C contours define opposite ends of a high pressure region like the high pressure region 140 of FIG. 4, the constricting orifice at the corner having the C contour will be subjected to back pressure from the orifice at the next adjacent downstream corner having the D contour. Likewise, the constricting B orifice will have back pressure from orifice 130e. The opposite effect will be provided when the core 60 is rotated in the opposite direction.

Figure 7:
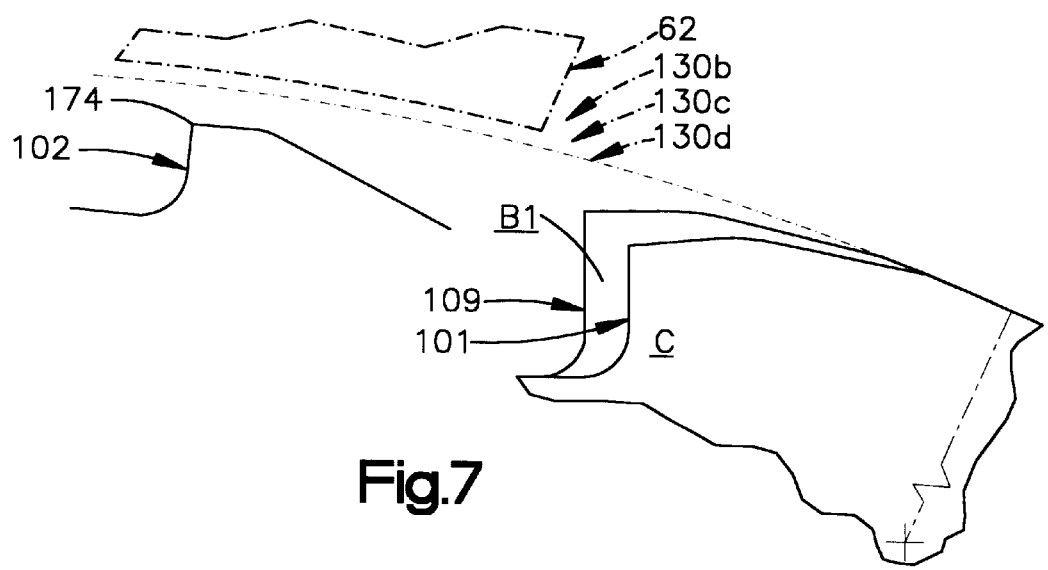
FIG. 7 is a view similar to FIG. 5 showing parts of an apparatus comprising a second embodiment of the present invention.

A second embodiment of the present invention is shown partially in FIG. 7. In the second embodiment, the D gap again has a very small size, in the range of 0.040 to 0.120 millimeters. In this valve, however, the B and C gaps are different size. The size of the C gap is 70% of the combined sizes of the B and C gaps, while the B gap is 30% of the combined sizes of the B and C gaps. Depending on the design chosen, however, gap C can range from 55% to 100% and, accordingly, gap B from 45% to 0%.

From the above description of the invention, those skilled in the art will perceive improvements, changes and modifications. For example, the present invention is equally applicable to a relatively rotatable valve part having more or less than nine lands and grooves. Also, a gap "e" could open slightly at high valve angles. Such improvements, changes and modifications within the skill of the art are intended to be covered by the appended claims.

Having described the invention I claim:

1. Apparatus comprising:

first and second relatively rotatable valve members having a common axis, said valve members being configured to direct hydraulic fluid to flow between said valve members from inlet ports to outlet ports;

said valve members having radially opposed lands and grooves defining orifices that enlarge and orifices that constrict upon relative rotation of said valve members from neutral positions through a range of movement of said valve;

a pair of said constricting orifices being located in parallel between said inlet ports and said outlet ports, each of said pair of parallel constricting orifices being defined by a chamfered corner of a corresponding one of said lands;

said valve members comprising means for providing back pressure at selected orifices between said outlet ports and said inlet ports, said selected orifices including both of said pair of parallel constricting orifices;

said means for providing back pressure comprising a third land which is spaced from said pair of lands, said third land defining a third orifice located in series with said pair of parallel constricting orifices;

said third orifice having a constant size for all relative positions of said first and second valve members through said range of movement of said valve.

2. An apparatus as set forth in claim 1 wherein said third orifice is substantially smaller than each one of said first and second orifices when said valve is in a neutral position.

3. An apparatus as set forth in claim 2 wherein the size of said third orifice is in the range of from about 15% to about 50% the size of each of said first and second orifices when said valve is in neutral position.

4. An apparatus as set forth in claim 1 wherein said third land has a corner that is disposed radially inward of its associated sleeve land when said valve is in the neutral position and when said valve is rotated from the neutral position.

* * * * *